United States Patent [19]
Burns et al.

[11] Patent Number: 6,003,376
[45] Date of Patent: Dec. 21, 1999

[54] ACOUSTIC SYSTEM FOR MEASURING THE LOCATION AND DEPTH OF UNDERGROUND PIPE

[75] Inventors: Alan A. Burns; Gary A. Hayter; Stephanie A. Griffin; Joseph W. Maresca, Jr., all of Mountain View, Calif.

[73] Assignee: Vista Research, Inc., Mountain View, Calif.

[21] Appl. No.: 09/096,422

[22] Filed: Jun. 11, 1998

[51] Int. Cl.[6] .................................................. G01N 29/18
[52] U.S. Cl. ................................................ 73/584; 73/597
[58] Field of Search ............................. 73/584, 592, 594, 73/597, 40.5 A; 367/119

[56] References Cited

U.S. PATENT DOCUMENTS

| | | |
|---|---|---|
| 2,420,439 | 5/1947 | Morrison . |
| 2,838,741 | 6/1958 | Mason . |
| 4,016,942 | 4/1977 | Wallis, Jr. et al. ...................... 175/45 |
| 4,911,012 | 3/1990 | Ziska ........................................ 73/584 |
| 5,036,497 | 7/1991 | Heitman ................................. 367/120 |
| 5,127,267 | 7/1992 | Huebler et al. .......................... 73/584 |
| 5,412,989 | 5/1995 | Eberle et al. ............................ 73/592 |
| 5,452,263 | 9/1995 | Heitman ................................. 367/120 |

FOREIGN PATENT DOCUMENTS

| | | | |
|---|---|---|---|
| 60-238733 | 11/1985 | Japan ...................................... 72/592 |
| 60-238734 | 11/1985 | Japan ...................................... 73/592 |

*Primary Examiner*—John E. Chapman
*Attorney, Agent, or Firm*—David H. Jaffer

[57] ABSTRACT

An acoustic method and apparatus for measuring the horizontal surface location and depth of any type of underground pipe or conduit, including nonmetallic or nonconductive pipe, such as sewer, gas, and water pipes, which cannot be detected with electromagnetic locators. A continuous-wave (CW) acoustic signal is injected into and transmitted through the fluid (liquid or gas) in the pipe. The horizontal surface location and depth of the pipe are determined from an analysis of the phase measurements derived from an array of acoustic measurements, which are made at the surface and approximately perpendicular to the direction of the underground pipe.

50 Claims, 13 Drawing Sheets

ACOUSTIC SYSTEM FOR MEASURING THE LOCATION AND DEPTH OF UNDERGROUND PIPE

BACKGROUND OF THE INVENTION

1. Field of the Invention

The present invention relates to an acoustic method and an apparatus for measuring the horizontal location and/or the depth of underground pipe and conduit. It is especially useful for nonmetallic or nonconductive pipe such as sewer, gas and water pipes.

2. Brief Description of the Prior Art

Most underground utility pipe and conduit are located within 10 ft of the surface of the earth. The majority of this piping is found in the upper three feet. The number, location and depth of these utility lines are often unknown. Engineering drawings are sometimes incomplete, out of date, or inaccurate. Because of the existence and increased use of nonmetallic pipe and conduit, and the fact that horizontal drilling is replacing traditional trenching methods, the need for pipe and conduit detectors is even more important today than it has been in the past. Pipe and conduit detectors can play an important role in utility planning, construction and bidding; they are useful tools for obstacle avoidance in both open trenching and horizontal drilling operations.

There are many methods available for detecting metallic pipe. These so-called "electromagnetic" methods, however, do not work on nonmetallic pipe. Yet, most of the utility pipe in use and now being installed (for example, sewer, gas and water) is made of nonmetallic materials. This is also true of many other types of piping (e.g., underground petroleum piping found at retail service stations). Detection of sewer pipe, especially laterals, is particularly a problem, because both the older and newer pipes are nonmetallic. Acoustic methods have recently been introduced as a means of detecting the horizontal location of nonmetallic pipe, but no acoustic method has been used to measure depth. In this specification, the projected position of the buried pipe on the surface of the ground will be referred to as "location," "horizontal location," "horizontal surface location," or "surface position." Location is a two-dimensional ground-surface measurement and does not include a measurement of depth. Location and depth of the pipe are referred to separately in this specification. Together they define the three-dimensional location of the underground pipe.

Most of the acoustic systems described in the prior art work as follows. First, an acoustic signal—in the form of a pulse, chirp or continuous wave (CW)—is injected into the pipe. As the signal travels along the length of the pipe, a portion of its acoustic energy propagates outward and into the surrounding soil. Because of the high attenuation of acoustic signals in soil at higher frequencies, the source frequencies are usually less than 3 kHz and more typically between 100 and 500 Hz. Second, receive sensors are mounted on the ground surface, or inserted a few inches deep, at a number of locations in the putative vicinity of the buried pipe until the acoustic signal propagating from the pipe is detected. The location of the pipe is determined from the magnitude of the signal. The location is associated with the strongest received signal. Accelerometers and geophones have been used successfully as receive sensors in the field.

Most commercially available acoustic systems are based on magnitude measurements. U.S. Pat. Nos. 5,491,012, 5,036,497, 5,452,263, and 5,412,989 teach methods for locating underground pipe based on the magnitude (or intensity) of the received acoustic signal. In general, these systems differ mainly in the method of acoustically exciting the pipe.

In U.S. Pat. No. 5,491,012, Ziska presents a method for excavating an underground sewer pipe that includes an acoustic technique for locating that pipe. A source of sound is introduced into the sewer line, and a detection sensor is moved along the surface of the ground; the strongest signal detected indicates the location of the pipe.

In U.S. Pat. Nos. 5,036,497 and 5,452,263, Heitman presents an acoustic method for locating water pipes and other types of pressurized lines. In this invention, the pipe is excited by a pressure transient wave (shock wave), which is produced by quickly opening and closing a valve on the pipe. At the surface, one or two sensors measure the magnitude of the signal in order to locate the pipe. (If one sensor is used, it is the peak signal that indicates the location of the pipe; if two sensors are used, the location is indicated when the magnitude of the received signal is the same at both sensors.)

In U.S. Pat. No. 5,412,989, Eberle et al. describe an acoustic system for locating buried gas pipe and other nonmetallic pipe in the upper meter of the ground that is also based on the magnitude of the received signal. In this invention, the sound source is a broad band of frequencies (e.g., a swept sine excitation from 100 to 1,000 Hz). Eberle claims that this means of excitation produces a signal at the surface of the ground that has a higher signal-to-noise ratio (SNR) than excitation using only a single frequency (e.g., 400 Hz). The location estimates are based on the mean square signal strength.

Location systems that measure the magnitude of the signal can be subject to large errors. The peak magnitude is dependent not only on the strength of the signal but also on sensor-to-ground coupling. If there is inconsistent coupling, it is possible that the signal received by a sensor located directly above a buried pipe may actually be weaker than one received by a sensor farther away. Interpretation of the received signal can be further confused, because man-made and topographical anomalies will also affect the magnitude of the signal. Thus in practice it is possible that no clearly defined peak or signal maximum will be found, and equal signals may not occur at equal offsets from the pipe. This can lead to large errors in the horizontal location of the pipe. In some instances, the magnitude of the received signal is so ambiguous that false and missed detections occur. The applicability of location systems that measure the magnitude of the signal tends to be limited to very shallow depths (that is, to within 3 ft of the ground surface).

In U.S. Pat. No. 5,127,267, Huebler avoids the problems of sensor-to-ground coupling and other factors affecting the strength of the acoustic signal strength. He uses the time of arrival of an identifiable acoustic signal to locate the pipe. For a signal to be identifiable, his invention requires that the time between successive signals be long enough that one signal can be received before the next is transmitted. For this method to work, the time of the transmitted signal relative to that of the received signal must be known. The location of the pipe is assumed to be directly beneath the sensor that receives the signal in the shortest time (that is, the "minimum time of arrival"). If an array of sensors is used, the same transmitted signal must be received at multiple locations so that arrival times can be compared. The main advantage of Huebler's approach is that it minimizes sensor coupling issues. It is not obvious or necessary, however, that the shortest travel time corresponds to the closest geometrical position of the pipe. The travel time of the acoustic signal propagating through the pipe may take a quicker path through the ground and be detected at a position off the center of the pipe. This will occur, for example, if the propagation velocity of the signal through the pipe is less than through the surrounding soil. Actually, there is no unique place on the surface for the maximum signal to occur. Accurate location of the pipe can only be made analyzing acoustic data from both sides of the pipe.

The method and apparatus of the present invention addresses the problems encountered with both the magnitude-based and time-of-arrival-based systems described above and has a number of important advantages over them. First, it addresses the location accuracy problems of both measurement approaches. Second, it avoids the sensor coupling issues inherent in the magnitude-based systems. Third, the present invention provides a quantity not measured by any other acoustic system—an estimate of the depth of the pipe.

SUMMARY OF THE INVENTION

It is an object of this invention to provide a method and an apparatus for measuring the horizontal location and/or depth of underground pipe and conduit without excavation. The pipe or conduit may or may not be pressurized, may contain a gas and/or a liquid, and may be constructed of any type of material. The pipe or conduit may also contain wires or fiber-optic cable, and may be filled with a solid material.

Yet another object of this invention is to provide a method and an apparatus for measuring the horizontal location and/or depth of nonmetallic and nonconductive pipe and conduit—for example, pipe or conduit made of polyvinyl chloride (PVC), polyethylene or other types of plastic and composite materials, fiberglass, and other non-electrically conducting materials.

Another object of this invention is to provide a method and an apparatus for measuring the horizontal location and/or depth of sewer pipe, especially sewer laterals, primarily constructed of nonmetallic materials such as PVC and vitrified clay tile. The invention is also applicable to other types of gravity-flow piping such as storm drainage systems.

Yet another object of this invention is to provide a method and an apparatus for measuring the horizontal location and/or depth of underground gas and water pipe, especially those pipes that are constructed of nonmetallic materials. The invention is also useful for other types of pressurized and non-metallic piping systems such as underground fiberglass piping found at retail service stations.

Another object of this invention is to provide a method and an apparatus for measuring the horizontal location and/or depth of underground conduit and cable systems, especially those conduit and cable systems constructed of nonmetallic materials.

Yet another object of this invention is to provide a method and an apparatus to measure the location and/or depth of underground pipe and conduit using an acoustic measurement system.

Yet another object of this invention is to provide a method and an apparatus to measure acoustically the location and/or depth of underground pipe and conduit using the phase of the received signal.

Yet another object of this invention is to provide a method and an apparatus to measure acoustically the location and/or depth of underground pipe and conduit using the magnitude of the received signal.

The preferred method of the present invention uses a continuous-wave (CW) acoustic source to excite the pipe. For most underground utility and other shallow buried pipe, a CW signal, typically between 100 and 1,000 Hz, is transmitted along the pipe. As the signal propagates along the pipe, a portion of its energy escapes into the surrounding ground and makes its way to the surface, where it is measured with a geophone, an accelerometer, or other sensing device in a measurement transect that crosses and is approximately perpendicular to the buried pipe. Both the phase and magnitude of the acoustic signal are measured at each point in the measurement transect. The measurements can be made with a single sensor that is moved from point to point along the measurement transect, or with an array of sensors, or with several arrays of sensors until the required spatial coverage is obtained. It should be pointed out that the method is not limited to this range of transmitted signals; CW signals lower than 100 Hz and higher than 1,000 Hz can be used depending on the measurement application and subsurface conditions.

BRIEF DESCRIPTION OF THE DRAWINGS

FIGS. 10(a) and 10(b) show the phase and magnitude (expressed as signal-to-noise ratio (SNR)) of the received acoustic signal obtained in a measurement transect perpendicular to a sewer lateral buried at a depth of 38 in.

DETAILED DESCRIPTION OF THE PREFERRED EMBODIMENT

The preferred embodiments of the method and apparatuses of the present invention for measuring the horizontal location and/or depth of buried pipe are described below. The preferred method uses the phase of the received acoustic data for both the location and depth measurements. An alternative embodiment of the method, which uses the magnitude of the received acoustic data, is also described. There are a number of similar apparatuses that can be used to implement both embodiments of the method.

1. Overview

Figure 1:
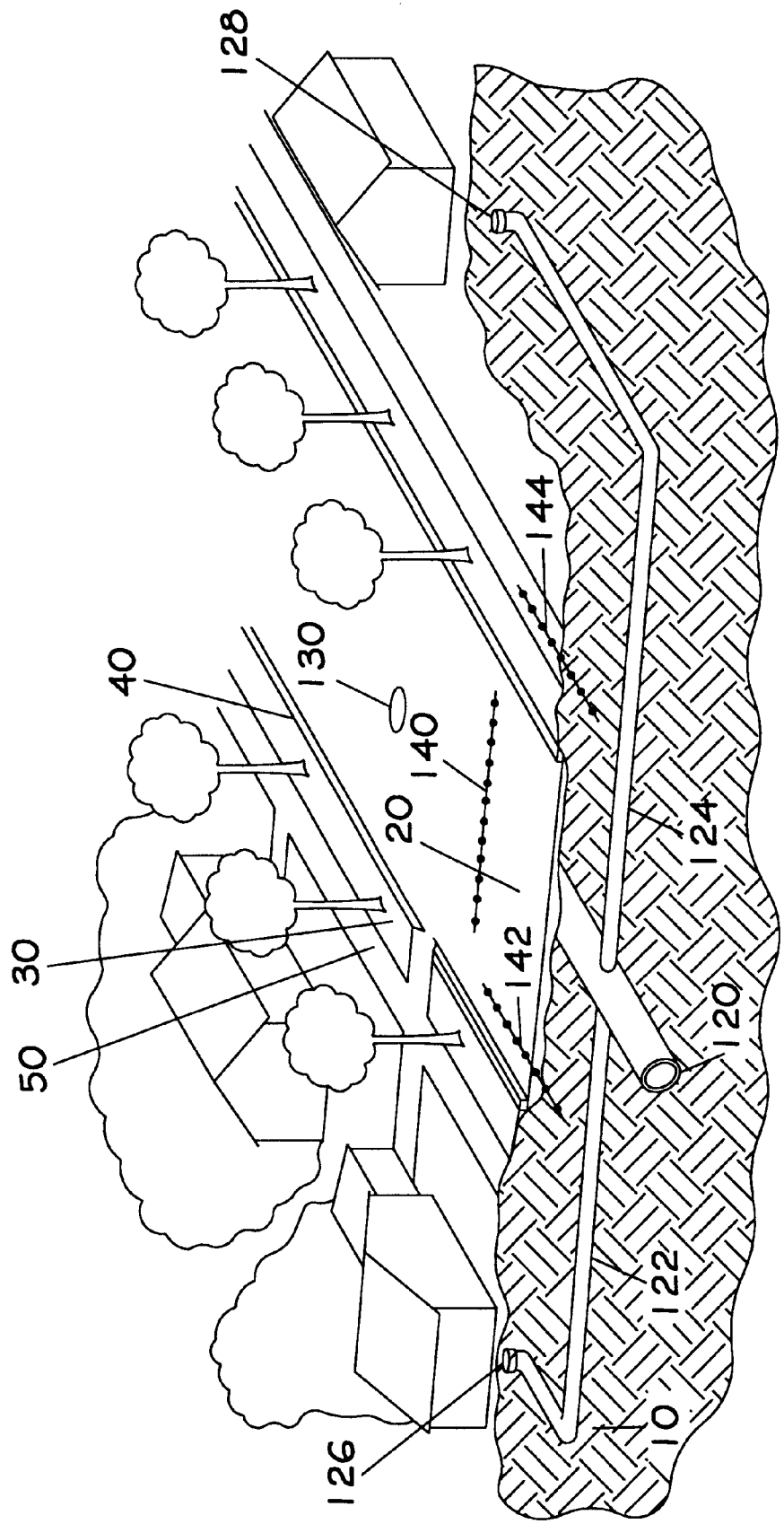
FIG. 1 shows a sewer main 120, sewer laterals 122, 124 and typical positions of measurement transects 140, 142, 144.

FIG. 1 illustrates an important application of the method of the present invention. FIG. 1 shows a sewer system in a residential neighbor and the locations of several measurement transects 140, 142, 144 with the present invention. FIG. 1 could just as easily represent a gas or water pipe system. In general, sewer pipe is made of vitrified clay or plastic pipe. The main 120 is at least 8 in. in diameter and is typically buried 6 to 12 ft. The laterals 122, 124 connecting each house or building with the main 120 are typically 4 in. in diameter and are typically buried 3 ft. Measurements, for example, can be made in the street for the main (transect 140) or lateral (transect 142), or along the median strip (transect 144) between the curb and the sidewalk, the sidewalk or numerous other positions. For best accuracy and/or simplest data processing, the measurement transects should be approximately perpendicular to the pipe.

The preferred method and apparatus of the present invention uses the relative phase of received acoustic signal to both measure the horizontal location and depth of underground pipe and conduit. The horizontal location and depth of the underground pipe are determined from an analysis of three or more acoustic measurements, which are made at the surface of the ground and approximately perpendicular to the direction of the underground pipe. For accurate estimates, at least one of the three measurements should be taken on the side opposite the pipe from the other two. However, this is not necessary if one can extrapolate, by symmetry, the measurements made on one side of the pipe to predict the measurements that would be measured on the other side of the pipe.

Figure 2:
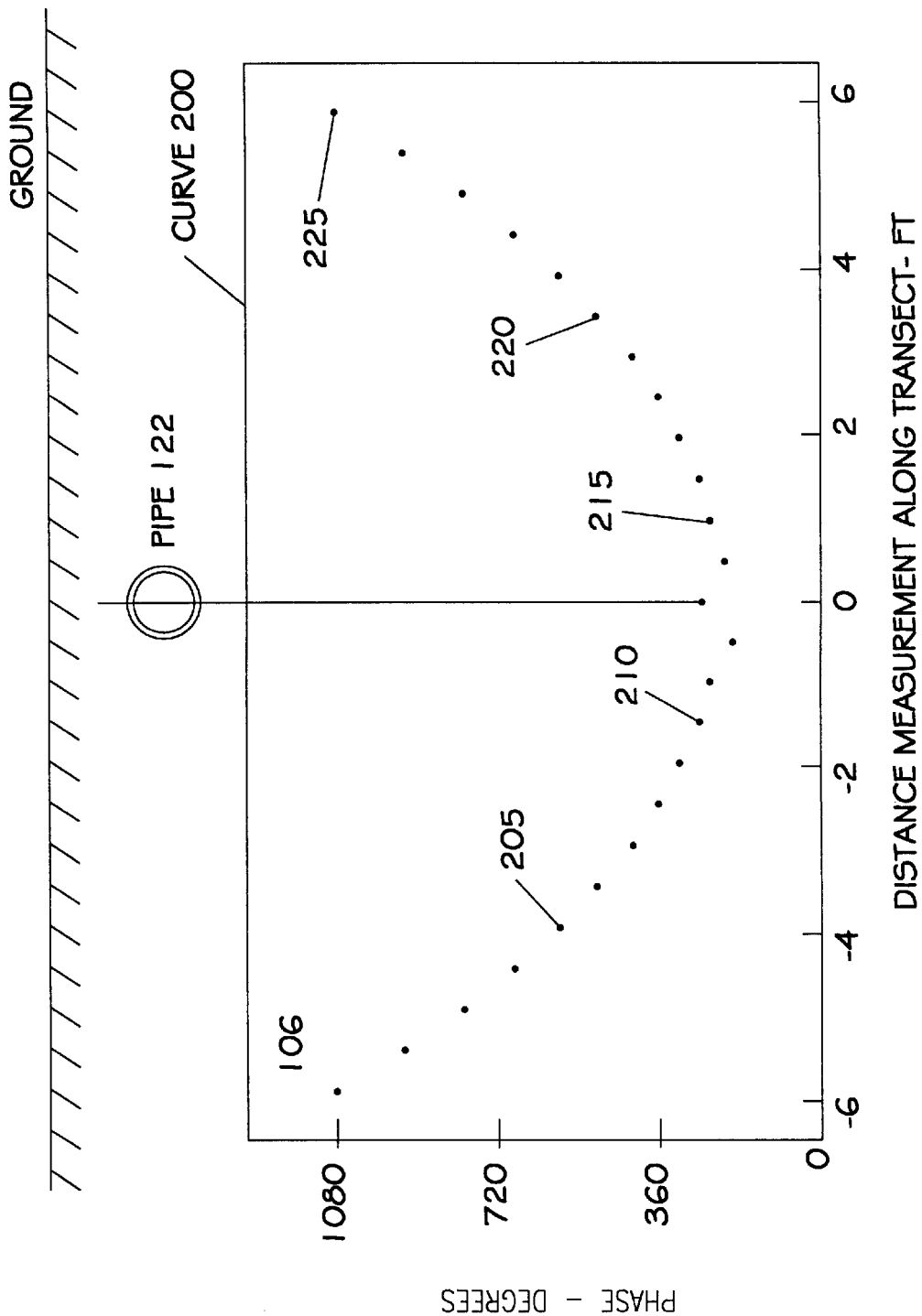
FIG. 2 is an example of the acoustic phase data 200 collected across a sewer lateral 122.
Figure 3:
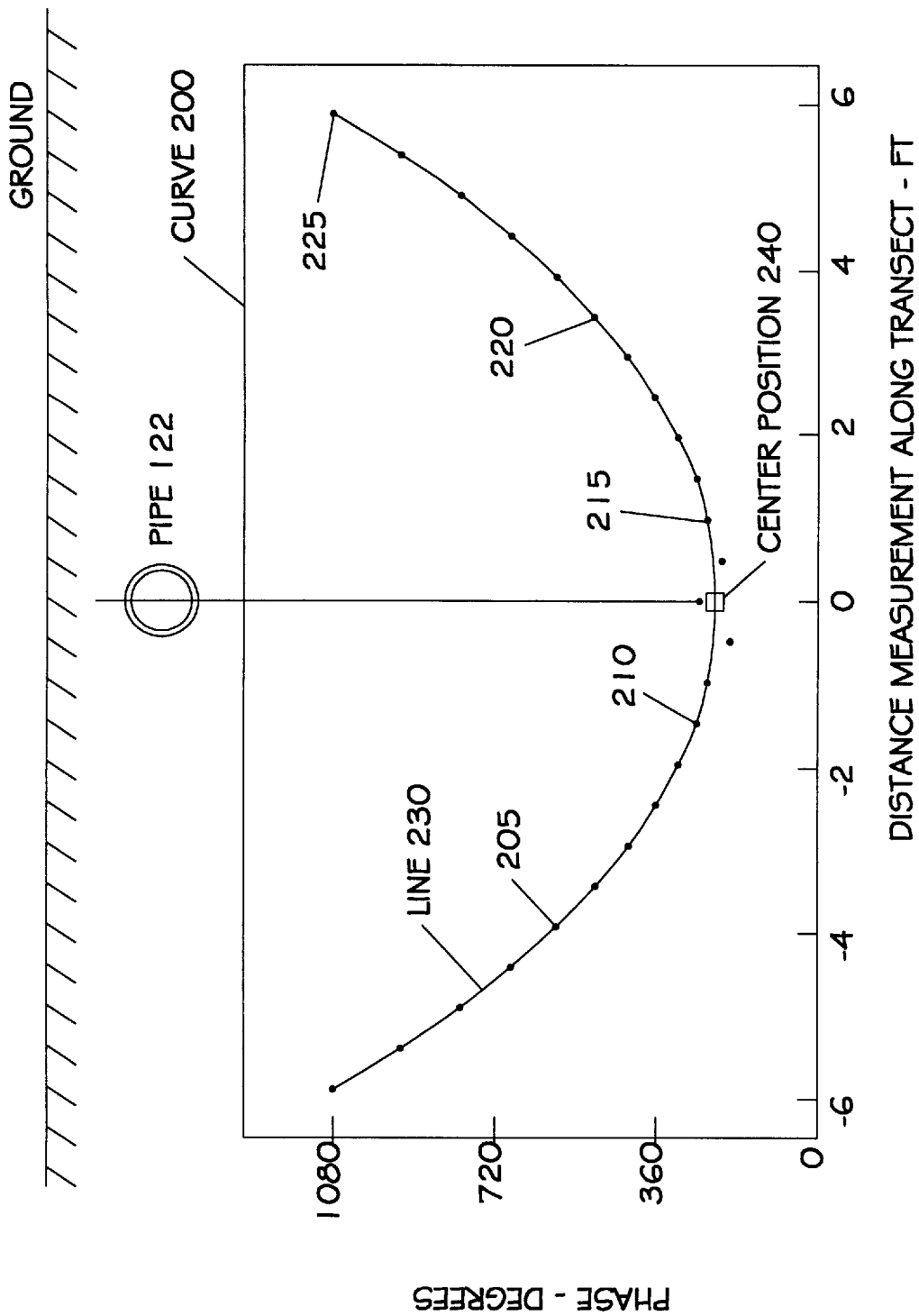
FIG. 3 is an example of the fit of a mathematical curve 230 to, or a model prediction 230 of, the phase data 200 shown in FIG. 2.
Figure 4:
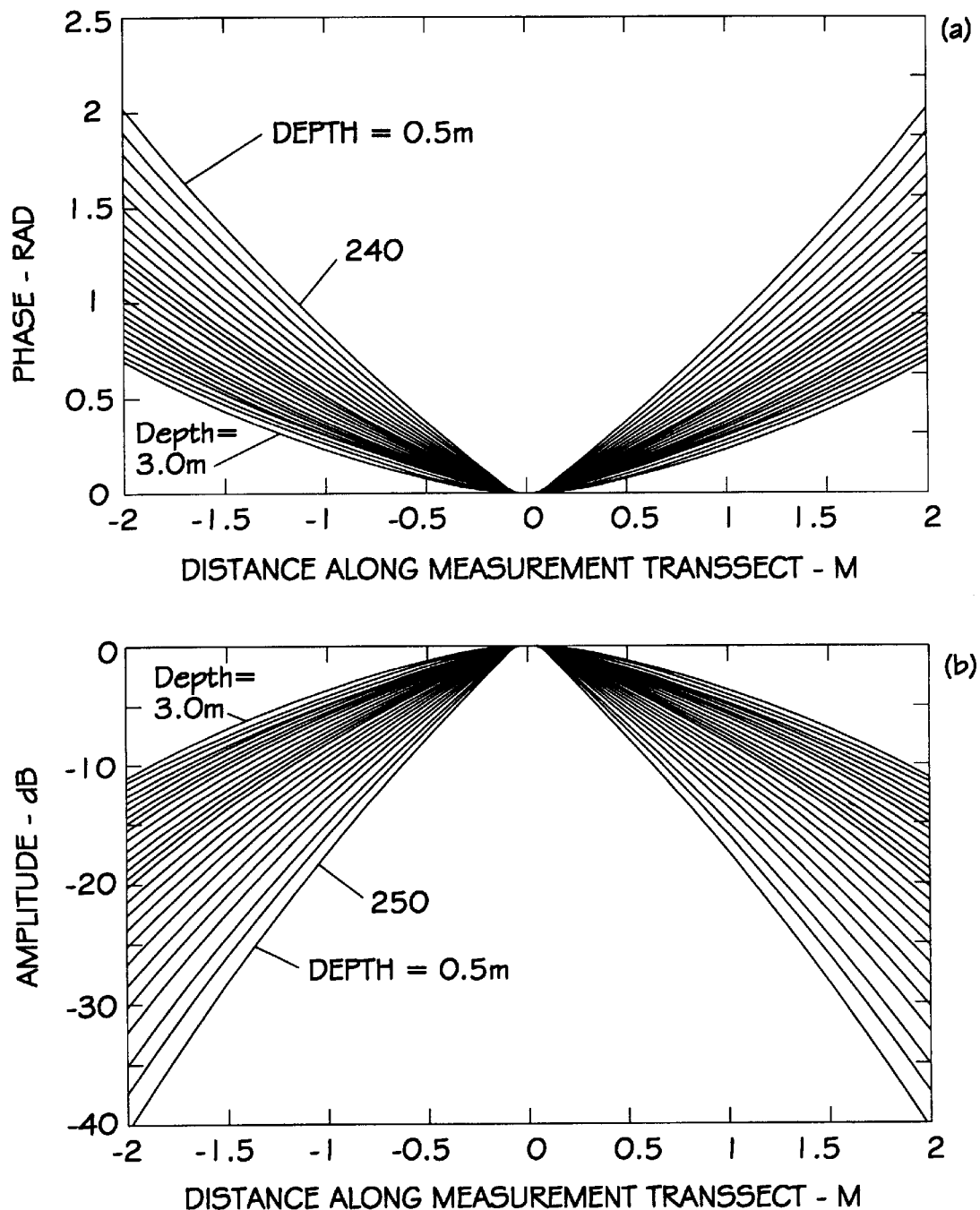
FIG. 4 shows examples of model predictions of the acoustic phase 240 (FIG. 4(a)) and magnitude 250 (FIG. 4(b)) for pipe buried at different depths ranging from 0.5 m to 3.0 m.

As shown in FIGS. 2 through 4, the analysis recognizes that the phase of the received acoustic signals has a predictable, nonlinear shape when plotted as a function of horizontal distance across the pipe. The phase data 200 shown in FIG. 2 illustrates the type of data that would be collected over a sewer lateral buried at a depth of approximately 3 ft using a CW acoustic source that was located in a sewer main. FIG. 3 shows a mathematical curve 230 that is fit to be data. The horizontal location of the pipe is determined from the minimum (centroid) of the phase data 200 collected on both sides of the pipe, and the depth is determined from the shape of the phase data. If a mathematical curve 230 is fit to the data, as illustrated in FIG. 3, then the location is determined from the minimum of the phase curve 240 and the depth is determined from the shape of the phase curve. While it is possible to search for the minimum value of the measured phase data 212 to make a first estimate of the location of the pipe using either a one 212 or 214 or two-point measurement (comprised of any combination of two data points 211 through 215), the centroid of the phase data collected at three or more locations directly above and on both sides of the pipe (for example, acoustic data points 207 through 219) gives a more accurate estimate of location.

The phase curve 230 shown in FIG. 3 can be defined by the output of a mathematical model of the acoustic measurements. FIG. 4 illustrates how the shape of the phase (FIG. 4(a)) and magnitude (FIG. 4(b)) curves predicted from a model of the received acoustic data changes as a function of depth. The predicted phase measurements are shown in FIG. 4(a), and the predicted magnitude measurements are shown in FIG. 4(b). The steeper the curve, the more shallowly buried the pipe. The model estimates were made for pipe buried from 0.5 to 3 m in depth and assumed that the propagation velocity and attenuation were 350 m/s and 10 dB/m, respectively. The depth of the pipe is determined directly from the curve that best matches the measured phase data. This model includes the acoustic contributions from along the pipe, both upstream and downstream of the measurement location.

There are many ways to implement this model-based approach. Accurate estimates of depth are made when the phase measurements predicted by the model accurately match the measurements made by the sensors. When the number of phase measurements exceeds the number of unknown variables in the model, a least-squares solution is used to match the model curve with the measured data. The use of a model is a unique approach for determining depth. The same approach can be implemented for the magnitude data, but here, because of sensor coupling issues, the accuracy of both location and depth estimates is not as good as those made with the phase measurements.

The signal-to-noise ratio (SNR) of each acoustic sensor can be used to determine whether a received signal is strong enough for use in either the phase or magnitude analysis; if not, it may be necessary to gather additional data from the sensor receiving that signal, or to simply ignore the data from that sensor in the ensuing analysis. One method of estimating the SNR is to divide the variance of the magnitude data collected at the operating frequency, which contains the acoustic signal from the pipe, by the variance of the magnitude data collected at another frequency, which does not contain the acoustic signal from the pipe.

Figure 5:
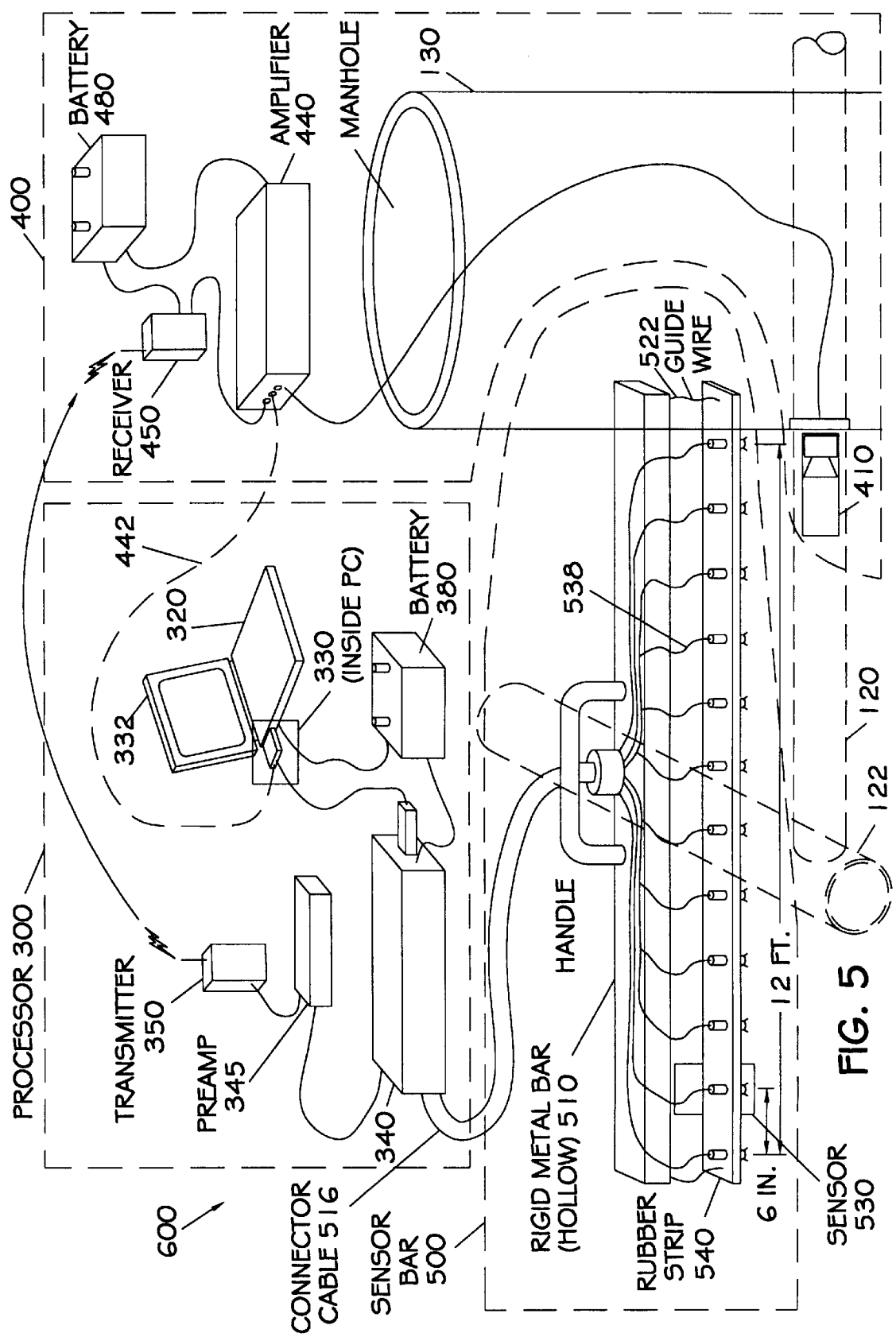
FIG. 5 illustrates the preferred embodiment of the apparatus used to implement the method for measuring the location and depth of sewer laterals and other types of gravity-fed piping.
Figure 6:
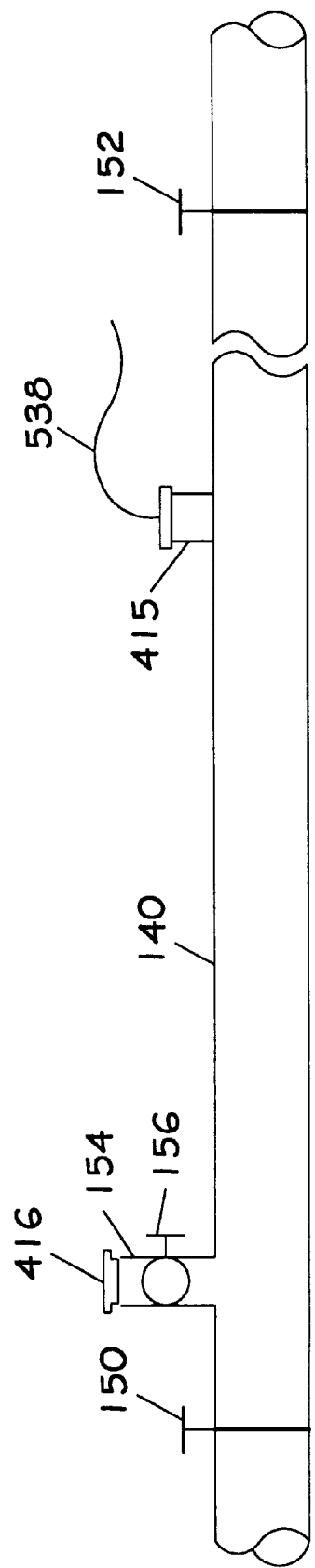
FIG. 6 illustrates the apparatus 415 that generates a CW signal in a pressurized pipe 140 such as gas or water pipe.
Figure 7:
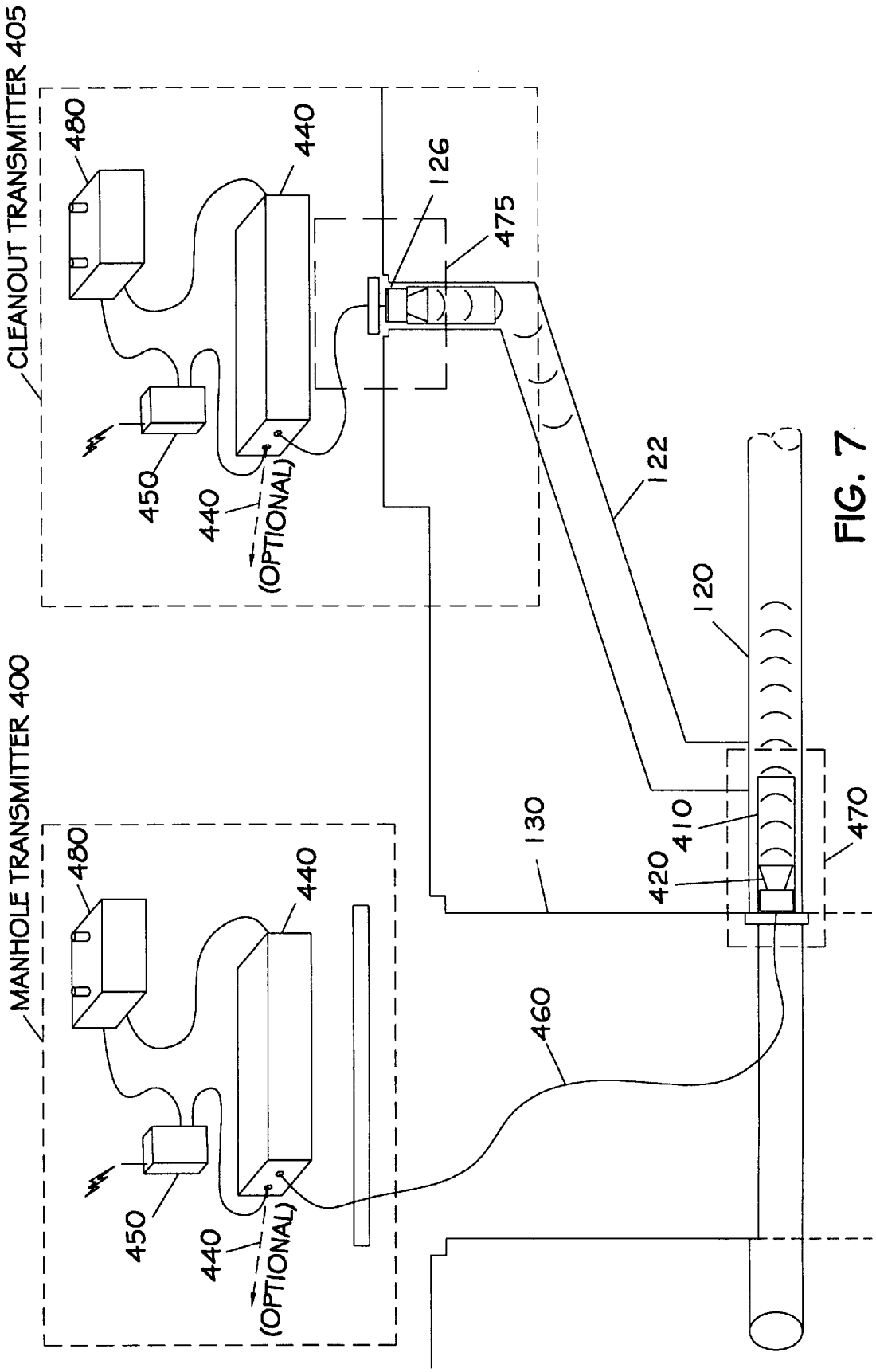
FIG. 7 illustrates the alternative apparatuses 400, 405 that generate CW signals in a sewer main or a sewer lateral.

FIG. 5 illustrates an apparatus 600 that can be used locate and measure the depth of sewer laterals and any type of gravity-flow piping. The apparatus 600 is comprised of an electronic processor 300, an acoustic sensor signal-receiving array 500, and an acoustic transmitting system 400. (If the transmitter source is adapted to mount on the outside wall of a pipe 415, as shown in FIG. 6, then the same processor 300 and signal-receiving array 500, can be used to locate and find the depth of any type of pressurized pipe, including gas, water, and petroleum pipe.) For both pressurized and gravity-flow pipe, a CW acoustic signal is injected into and transmitted through the fluid (gas or liquid) in the pipe. In the former application, as illustrated in FIG. 7, the acoustic signal is generated either by inserting the transmitter into the sewer pipe through a manhole 130 to a main 120, or alternatively by attaching the transmitter directly to a lateral 122 at a clean-out 126. In the latter application, as illustrated in FIG. 6, the mechanism that generates the transmitted signal is attached either to the outside wall of the pipe 415 or to a section of pipe with a valve 416, thus allowing communication between the transmitter and the fluid in the pipe. For best performance for utility pipe measurements, the signal should be less than 1,000 Hz.

Figure 8:
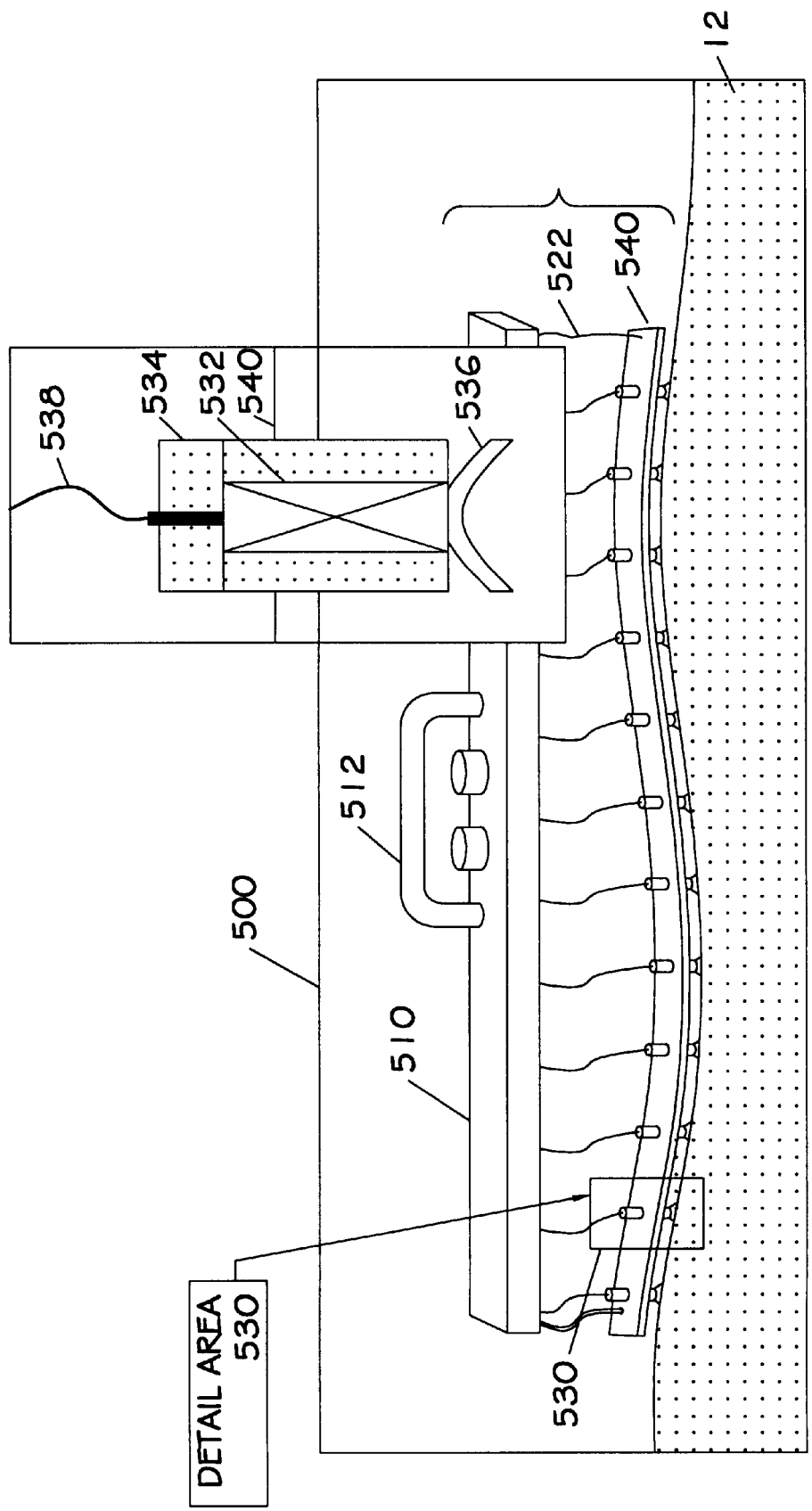
FIG. 8 illustrates the implementation of a signal-receiving array.
Figure 9:
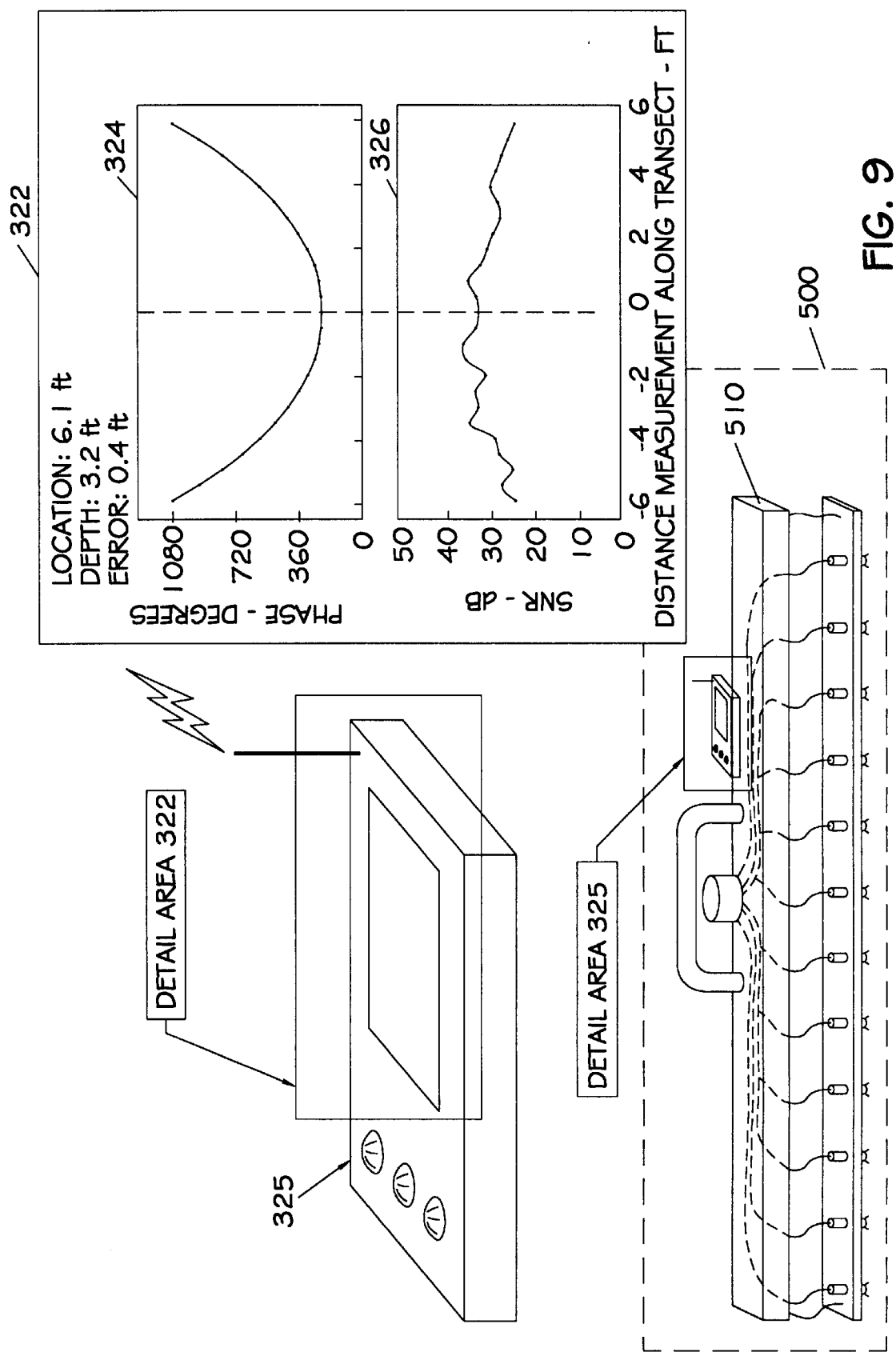
FIG. 9 illustrates an embodiment of the signal-receiving array apparatus with the electronic processor implemented with a microprocessor mounted on the array.

The signal-receiving array 500, shown as part of the entire system in FIG. 5 and shown separately in FIG. 8, is designed to allow easy measurements over terrain typical of both rural and urban environments, even when the terrain is uneven along the measurement transect. As shown in FIG. 8, suspended from a rigid bar 510 by electrical 538 and guide 522 wires, the individual sensors 530 are mounted in a flexible strip of sound absorbing material 540 and are able to follow the varying contours of the terrain 12. The length of the bar 510 and the number of sensors 530 is arbitrary and depend upon the operating frequency and the desired operational depth. FIG. 9 shows an implementation of the apparatus, when the electronic processor 322 (corresponding to 300 in FIG. 5) includes microprocessor and is mounted on the array bar 510.

The preferred embodiment of the apparatus 600, which is shown in FIG. 5, is designed to locate pipe to a depth of 10 ft and to measure the depth of pipe buried to depths of 3 to 4 ft with a single receiving array measurement; to measure the depth of pipes buried to depths between 4 and 10 ft, generally two measurements with the receiving array will suffice. These depths are typical of sewer laterals and gas and water pipes. In the preferred embodiment of the apparatus, twenty-five sensors are spaced at 6-in. intervals along an array whose length (or "aperture") is 12 ft. The narrow spacing between sensors allows unambiguous measurements of phase at any frequency below 1,000 Hz, and the 12-ft aperture is large enough for the majority of applications that accurate measurements can be obtained from a single positioning of the array.

The same method and apparatus can also use the magnitude of the received acoustic signal to measure the horizontal location and depth of underground pipe and conduit; however, the method and apparatus are not as accurate as those estimates made with the phase measurements because of the sensor-to-ground coupling issues.

2. Method

Although the method of the present invention can use either the phase or the magnitude of the received signal in order to compute a measurement, there are substantial advantages to using the former. Thus, as described here, the preferred embodiment uses phase measurements. Magnitude measurements, which are routinely collected, are used only to assess the quality of the data and, although useful for quality control, are not an essential part of the method.

In the preferred method of the present invention, a periodic, acoustic signal is transmitted along an underground pipe. The phase of this signal is measured at ground level at a minimum of three different positions above the supposed location of the pipe, such that the transect of the sensors is approximately perpendicular to the pipe, with at least one measurement taken on each side of it. If two location estimates are at different distances along the pipe, then the angle between the measurement transect and the pipe can be determined. If the transect is not perpendicular, then the measurement of depth can be repeated with the transect properly oriented, or the misalignment can be corrected during the data processing.

In the preferred embodiment, the transmitted signal is a CW signal and the receivers are acoustic sensors mounted in an array. For most shallow-buried pipe, transmit frequencies from 100 to 1,000 Hz work well. For most applications, a linear array, comprised of at least three acoustic sensors, is preferred. However, two-dimensional arrays and arrays with other geometrical configurations may also be used. An array also has the advantage that the acoustic data may be collected coherently, which results in a higher SNR than obtained with acoustic data collected separately (i.e., incoherently).

The location of the pipe is determined from the "minimum" of a nonlinear curve or a model-based prediction of the phase data fitted to the raw phase data. The location can also be estimated from the centroid of the phase data obtained in the vicinity of the pipe. Because of random fluctuations, different soil propagation conditions, and phase contributions from other sections of the pipe to each sensor position along the measurement transect, the absolute minimum of the raw phase data may not be the best indicator of the horizontal location of the pipe. This is illustrated in FIG. 2. Provided that the shape of the surrounding data is generally consistent with the expected shape, in many instances, the minimum phase can be used to make a first estimate of the pipe location.

The depth of the pipe can also be derived from a model-based prediction of the phase data. That is, it is assumed that the depth of the pipe is equal to the value at which the model-based prediction best matches the measured data. This model-based method for measuring depth is described below. The model-based method works well, because propagation of acoustic signals in underground pipe and the surrounding soil can be modeled very accurately.

For data quality purposes, the method includes an estimate of the SNR at each sensor position. This estimate can be obtained as follows. The magnitude of the acoustic signal is measured at each sensor, both at the transmitted frequency and at another frequency that is close to but not identical to the transmitted frequency. The data obtained at the transmitted frequency include the signal as well as the system and background noise, whereas the data obtained at the nearby frequency are strictly a measure of only the noise. The ratio of the variances in these two measurements provides an assessment of the SNR of the received acoustic data. If the SNR is sufficiently high, the data from that sensor can generally be considered useful in the location and depth analyses.

Acoustic Model to Measure Location and Depth. FIG. 4 presents the results of a model calculation of the phase and magnitude of the received signal along a transect that is perpendicular to the pipe. The phase curves 240 are shown in FIG. 4 (*a*), and the magnitude curves 250 are shown in FIG. 4 (*b*). These curves were generated for a particular propagation velocity and attenuation in the pipe and in the ground. A family of curves is shown, representing measured phase and magnitude responses from pipes buried at different depths. In this example, it was assumed that the velocity at which the transmitted signal propagated through the soil was 350 m/s and that the attenuation of this signal in the soil was 10 dB/m. Both the phase and magnitude curves have been shifted vertically so that all the minimums are matched. This presentation better illustrates how the shape of the curve changes with depth. The slope of the asymptote of the curves is defined by the scalar quantity $2\pi fv$, where f is the operating frequency and v is the propagation velocity in the soil. If all of the curves were extended to infinity, this scalar quantity would be approximately the same for all the curves. In practice as the depth of the pipe increases, the attenuation of the acoustic signal in the ground eventually prevents the acquisition of enough data to accurately match the model prediction as the distance from the pipe becomes large.

The information provided by the phase and magnitude curves is theoretically similar. In practice, the magnitude data are not well described by the model—because each sensor couples differently with the ground, the magnitude of the signal does not change as predicted by the model. The effect of non-uniform coupling degrades the accuracy of both the location and depth measurements. Thus, this method would be very difficult to implement using the magnitude data. As long as the SNR of the received signal is not too low, however, the phase measured with each sensor is not affected by the sensor coupling. For this reason, measurement of phase is the preferred method for location and depth measurements.

Figure 10:
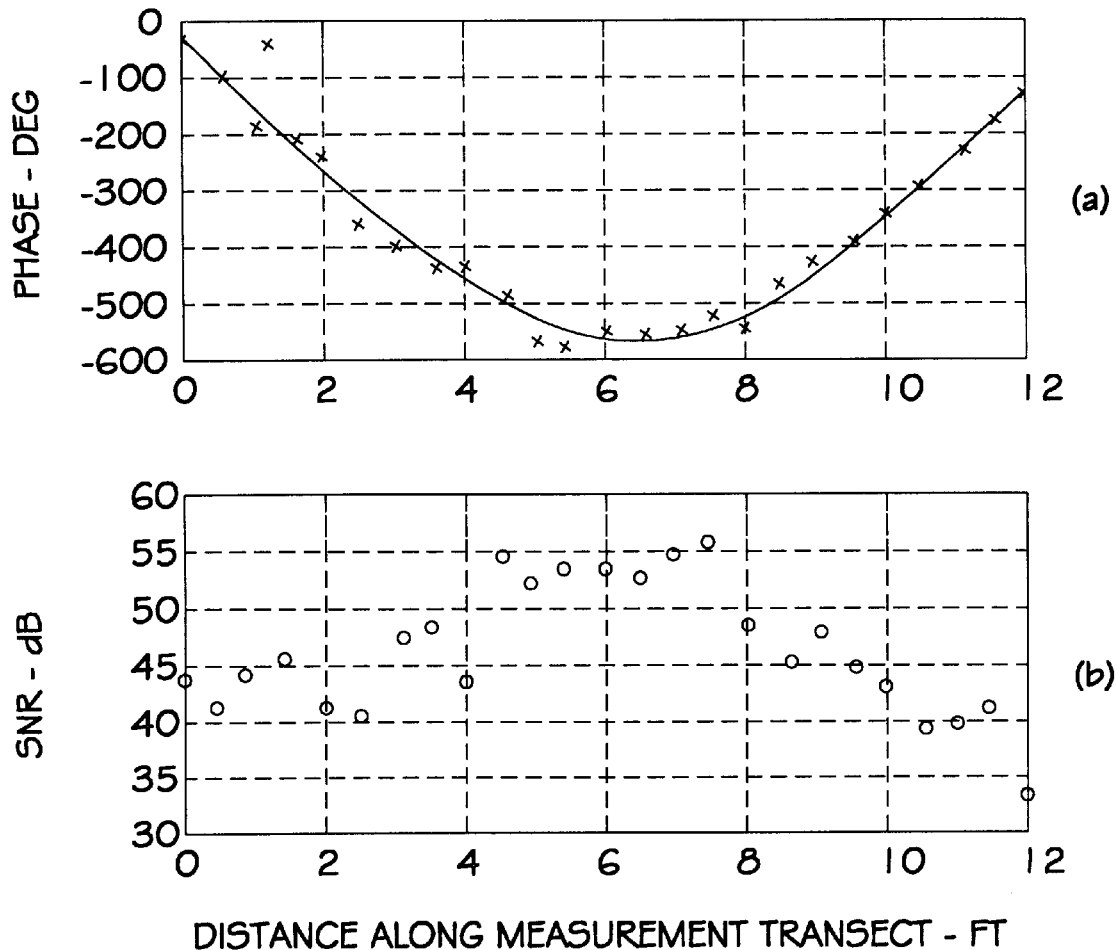

FIGS. 10(*a*) and (*b*) show the phase and magnitude, respectively, of the acoustic data measured with the present invention along a measurement transect that was perpendicular to a sewer later buried at a depth of approximately 38 in. A mathematical curve developed from an acoustic propagation model is fit to the phase data. The large uncertainty of the magnitude data is clearly evident. In contrast, the phase data are well behaved and are consistent with the model predictions. Accurate location and depth estimates can be made using the phase data. This is not true for the magnitude data. At best, the magnitude data in FIG. 10(b) can be used to estimate the location of the pipe.

For a given soil condition and a given pipe and pipe configuration, the magnitude and phase of the received signal measured along a transect that is approximately perpendicular to the pipe can be accurately modeled as the integral of the acoustic signals emanating from along the length of the pipe and propagating through the soil to each sensor location. By symmetry, the direction of propagation is immaterial, and the results determined using the phase measurements are not contaminated by acoustic standing waves and reflections. The integral equation describing this received signal is a function of depth, propagation velocity and propagation attenuation in the soil. These parameters can be determined by solving simultaneous equations using the measured phase or magnitude data. If the number of data points exceeds the number of unknown variables, a least-squares solution may be implemented. This model-based approach will work well as long as the propagation characteristics of the soil (i.e., velocity and attenuation) are reasonably uniform. The model estimates also assume that the elevation and position of each sensor are known and are input to the model. When this information is not available, it is assumed that the elevation is the same for all the sensors.

This integral model for the received acoustic signal is mathematically complex and a least squares solution would be difficult to implement. A geometric approximation to the complex integral model can be used to simplify the parameter estimation process. This approximate model is accurate when the attenuation of the soil is high. When the attenuation is high enough, the signal received from the pipe locations other than the point closest to the measurement transect are so weak that the sound radiating from the pipe can be considered a point source. This simple geometric model is given by $$\phi = (2\pi f/v)(d^2+x^2)^{0.5} + \phi_o = \alpha(d^2+x^2)^{0.5} + \phi_o \qquad (1)$$

where $\phi$ is the relative phase angle referenced to the transmit signal, f is the frequency of the transmit signal, v is the propagation velocity of the soil, $\alpha$ is the propagation constant, which includes the frequency and propagation velocity, x is the perpendicular distance from the pipe along the measurement transect, d is the depth of the pipe, and $\phi_o$ is an arbitrary phase angle that accounts for the unknown propagation distance between the acoustic source and the acoustic receiver. This model assumes that all of the acoustic contributions are derived geometrically from the pipe at the intersection of the pipe and measurement transect. While not true, because acoustic contributions are received from other sections of the pipe as well, it can often be used to solve for depth accurately.

The accuracy of the depth estimate will depend on the accuracy of the model, the validity of the underlying model assumptions, the aperture of the measurements, the uncertainty of the measured data, the accuracy of the position and elevation of each sensor in the array, and the accuracy of the curve fit. The accuracy of the geometric model defined by Eq. (1) was evaluated for a wide range of velocity and attenuation conditions using a complex model that integrates the contributions of the acoustic signal from all parts of the pipe and was found to be sufficiently accurate for most applications. The error is small because the curvature near the minimum of the phase curve is mainly controlled by the depth of the pipe. The largest source of error occurred when the terrain was uneven and the elevation of the sensors was unknown. For typical terrain (the crown of a road, with reasonably uniform grade changers), the errors were small, increasing only at step changes (discontinuities) in the ground surface.

The phase data and the phase model curve show that horizontal location estimates can be made with a smaller aperture than is required for depth measurements. In practice, accurate location estimates can be made when the acoustic measurements of the received signal, made on either side of the pipe, are sufficient to find the minimum of the phase curve. An aperture equivalent to the depth of the pipe will generally suffice. For accurate depth measurements, the total aperture must be large enough to accurately define the curvature of the phase. As a rule of thumb, the measurements should be centered on the pipe and the total aperture of the measurements should be equal to at least three to four depths. More accurate estimates of depth are obtained as the size of the aperture increases, with the attenuation of the acoustic signal in the soil being the limiting factor.

The location and depth of a sewer lateral determined from the empirical phase data in FIG. 10 correlates well with the phase curve predicted from the model of the measurement process described by Eq. (1). The location of the pipe, as determined from the minimum of the phase curve, is within 1 in. of the known location of the pipe. The measured depth of 38 in. is also within 1 in. of the actual depth of the pipe.

Phase Unwrapping. If the length of the measurement transect 140,142, 144 (FIG. 1) is greater than a wavelength of the transmitted signal (i.e., greater than 360 degrees of phase), then the spacing between each sensor measurement must be small enough to unambiguously keep track of the relative phase between each sensor measurement along the transect. This means that the spacing between measurements must be less than half a wavelength (i.e., two or more measurements per wavelength). In practice, a minimum of three measurements is preferred. Given that one or more measurements in a transect may be missing (e.g., due to the fact that uneven terrain may prevent a sensor from coming into contact with the ground during a particular positioning of the transect), at least four or five measurements are required for robust operation of the system. At 100 Hz, over 20 measurements per wavelength are made with an array of sensors spaced at 6-in. intervals; at 350 Hz, 6 to 7 measurements are made. A simple phase unwrapping algorithm is used to develop the phase curve. When the relative phase exceeds ±180 degrees, 360 degrees are added to or subtracted from the measured phase angle. There are many other ways, which can be used with the present invention, to resolve phase ambiguities. One very powerful method is to use multiple frequencies.

Figure 11:
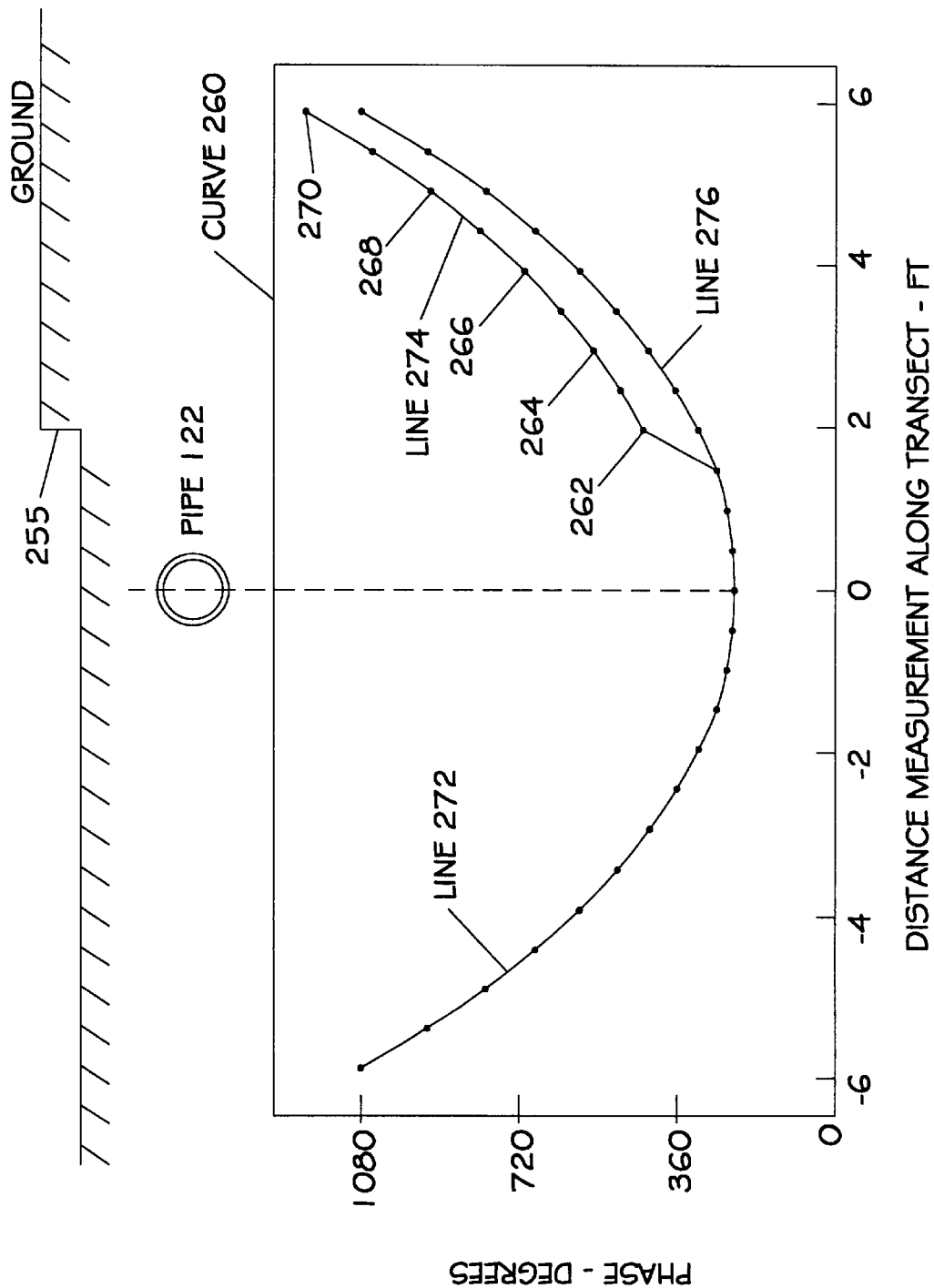
FIG. 11 is an example of the phase data collected across a discontinuity in the terrain before 274 and after 276 a correction has been made to remove the discontinuity.

Sensor Position and Elevation. The method of the present invention assumes that the relative position of each sensor is known and that the elevation of each sensor is the same or, if not, that the respective elevations of each sensor are known. Otherwise, uneven terrain can cause errors in location measurements and, especially, in depth measurements. The greatest errors occur at large or steep height changes 255 (e.g., a curb) along the measurement transect (FIG. 11). Such errors can be minimized by appropriate compensatory techniques employed during data collection and analysis. For example, FIG. 11 illustrates how the measured phase discontinuity between phase measurements 261 and 262 can be corrected by an appropriate shifting of the data 262 through 270 on one side of the discontinuity (curve segment 274) to match the data 246 through 261 on the other side (curve segment 272). This shifting must take into account the actual travel path of the signals to each measurement point and is not a simple offset adjustment. The final phase curve is comprised of curve segments 272 and 276.

Figure 12:
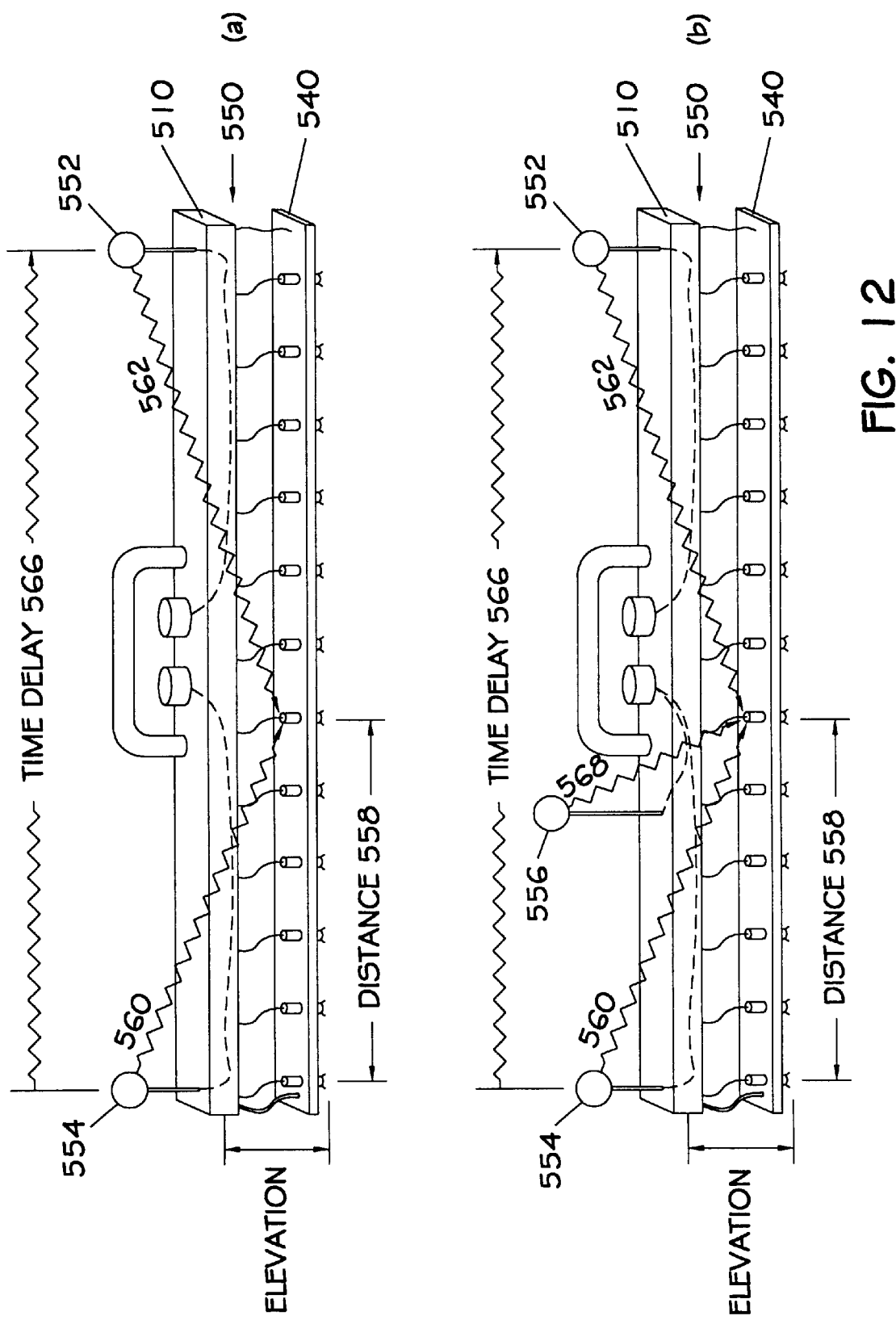
FIGS. 12(a) and 12(b) illustrate two simple apparatuses 550 for measuring the position and elevation of each sensor in an array.

Another way of minimizing this type of error is to use a positioning system to measure the position and elevation of each sensor, as shown in FIG. 12. The positioning system can be mounted on the sensor array bar 510. As illustrated in FIG. 12(*a*), a simple technique is to attach two or more transmitters 552, 554 to the rigid bar 510 and measure the travel time 560, 562 to each sensor in the array. The position and elevation of each sensor can be determined by triangulation. The travel time 566 between acoustic transmitters can be assumed or measured. Two or more acoustic transmitters at the same elevation on the sensor bar will suffice provided that the bar is level and held directly over the sensors during the positioning measurement. Otherwise, at least one of the sensors 556 should be at a different elevation (FIG. 12(*b*)).

If the position of any one the receive sensors in the flexible array strip 540 is known relative to at least one of the transmitters on the bar 510, then the propagation velocity needed to estimate the travel time between the transmitters can be measured by holding the sensor bar level and measuring the travel time between the transmitter and the sensor. If the distance between the transmitters is known, then the travel time can be computed using the propagation velocity. Another method of estimating velocity is to mount at least one acoustic sensor on the bar 510 at known distances from the transmitters.

Figure 13:
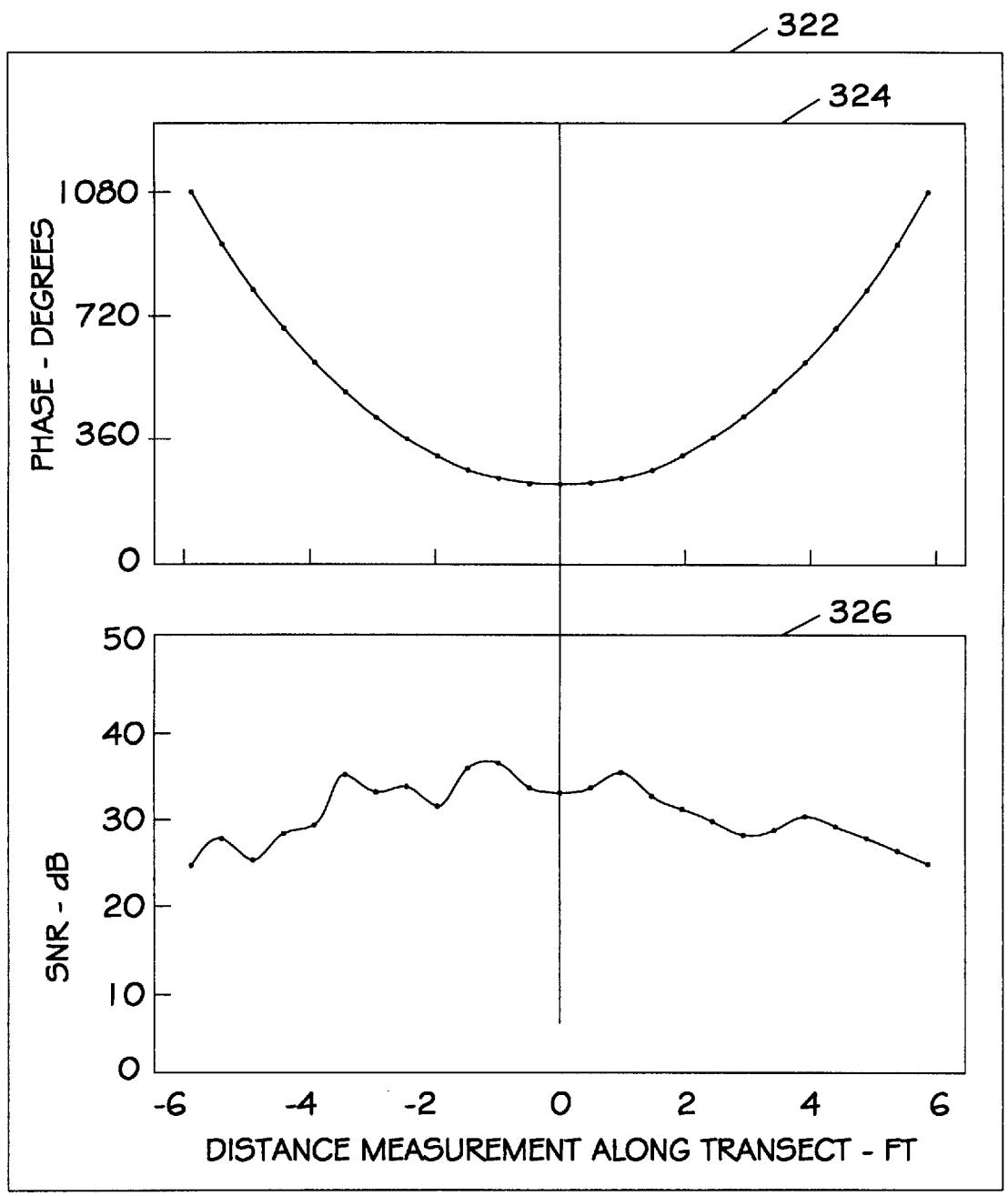
FIG. 13 illustrates a data quality display 322 showing the phase 324 and signal-to-noise ratio (SNR) 326 curves.

Data Quality Assessment. There are a number of data quality indices and graphical displays that can be used to optimize the data collection procedure, to indicate the presence of damaged sensors, and to improve the accuracy of the location and depth measurements. As illustrated in FIG. 13, one example is a real-time graphical display 322 of the measured phase 324 and the SNR 326 data plotted as a function of distance along the measurement transect. The integrated values of phase and SNR are updated with every data sample; this integration process enhances the signal and reduces the noise. Direct visual inspection of the phase data can serve to identify the presence of a pipe; to determine whether the pipe is somewhere below the array; to identify the horizontal location of a pipe; or to indicate the number of array measurements required to measure depth. If the pipe is under the central portion of the array and is buried at a depth that is less than one-quarter to one-third of the aperture (length) of the array, accurate estimates of depth can also be made. With a visual inspection of the shape of the phase data, one can rapidly discern whether the data are of high enough quality for accurate estimates of location and depth. Points that do not follow the expected theoretical shape of the curve will degrade the estimate; such points are easy to identify in this graphical display. Moreover, the visual inspection process is automated. An audio message may be generated to indicate the presence of a pipe, and whether or not an estimate of location or depth has been made. If no estimate has been made, the computer 320 (FIG. 5) or microprocessor module 325 (FIG. 9) will indicate that the depth measurement will require two measurements with the array. In addition, discontinuities in the phase data that may be associated with uneven terrain are easy to identify in the phase plot both visually and algorithmically. These discontinuities can be removed by means of the positioning system or through analysis. In general, graphs are displayed in real-time so that the operator can quickly verify the results of automated decisions.

The SNR plot 326 (FIG. 13) can indicate which sensors are collecting data, and whether or not the data from each sensor are adequate for use in the phase analysis. The SNR plot is also useful in verifying the existence of a pipe whose presence has been indicated by the phase curve. These decisions can and are also implemented automatically using predetermined SNR thresholds to determine if the data should be included in the analysis.

This type of real-time graphical data quality assessment is readily possible when a stand-alone computer 320 is used as the processor (FIG. 5). Such a display, or a simpler version of it, could also be implemented on a dedicated microprocessor in a module 325 mounted on the array bar 510 (FIG. 9).

Missing Data. The preferred embodiment of the present invention is designed to operate even if the data from one or more of the sensors in the array is missing. This is possible because the number of sensors in the array is more than sufficient to unambiguously unwrap the phase. One or more of the sensors may fail to yield good data during a measurement if the SNR is too poor to make a phase measurement, or if the sensor is not in contact with the ground due to poor contact or very uneven terrain. Failed sensors, poor ground contact, and lack of signal can be identified by the SNR data quality display or index.

If the data are deemed to be too poor for analysis, there are three simple ways to improve data quality. One is to simply repeat the measurement. The other two are to repeat the measurement using a different frequency or a slightly different measurement transect.

3. Apparatus

The method of the present invention can be implemented with a number of apparatuses. One apparatus, which is shown in FIG. 5, uses a stand-alone computer 320 in the processor 300 that collects and analyzes the data. In a second apparatus, which is shown in FIG. 9, this processor can be replaced by a microprocessor module 325 for operational convenience.

System Overview. FIG. 5 illustrates an apparatus 600 for implementing an acoustic system to measure the location and depth of sewer mains and sewer laterals. The system is comprised of a signal-transmitting system 400, a signal-receiving sensor array 500, and an electronic processor 300. FIG. 12 shows that an optional positioning system 550 can be mounted on the bar 510 to which the sensors are attached. The positioning system measures the position and elevation of each of the sensors 530 (or acoustic sensing elements), as shown in FIG. 5. The preferred embodiment shown in FIG. 5 is battery operated, but it can also be operated using conventional or generator power. The processor and the sensor array are powered by one battery 380, and the remote transmitter is powered by another 480. In this embodiment of the system, the transmitter 410 is attached to or inserted directly into the pipe (through an opening); it transmits a CW signal through the inside of the pipe. The signal transmitter is shown in FIGS. 5 and 7 (element 410) for gravity flow pipe and FIG. 6 (element 415 or 416) for pressurized pipe. The signal-receiving array is shown in FIGS. 5 and 8.

The same system configuration 600 shown in FIG. 5 works equally well on other types of underground, gravity-flow piping such as that found in storm drain systems. On pressurized piping systems containing liquid or gas, as shown in FIG. 6, the transmitter 415 can be attached directly to the pipe wall 140 or the transmitter 416 can be attached to an opening 154 in a section of pipe, usually one that can be isolated by mean of a valve 156. No other changes to the system are required. In FIG. 6, the line segment 140 is isolated from other sections of the line by means of valves 150 and 152. In both pressurized and gravity-fed lines, the longest transmission distances are usually obtained when the signal is propagated through the fluid in the pipe. This is especially true for pipes containing liquids, such as water lines and petroleum piping.

Referring to FIG. 5, the signal-receiving array 500 of the preferred embodiment is 12 ft in length. It is designed to efficiently locate nonmetallic piping buried at depths of 3 to 4 ft (typical of sewer laterals, gas lines and water lines) and to accurately measure the depth of such piping. The array can be longer or shorter than 12 ft; the design tradeoff is between the weight and ease of use of the system and the time required to acquire the data and to make a measurement. Measurements have been made with as few as one sensor without sacrificing performance, but with a substantial increase in the time required, as compared with the 25-sensor array that is the preferred configuration. A sensor measurement usually takes less than 30 s, and the acoustic measurements from all of the sensors in the array are made coherently.

The processor 300 controls the measurement, acquires the data, analyzes the data and displays the results. In FIG. 5, the processor 300 is shown as a stand-alone unit. As shown, the processor is comprised of a field-worthy laptop computer 320 containing a data acquisition and signal-conditioning card 330. The signal from each sensor 530 is amplified by the card; this amplification could easily be accomplished at the sensor 530. The wires from the 25 acoustic sensors are combined in an interconnection box and are sent via a cable to the data acquisition card 330 in the computer. The wires from the positioning system (shown in FIG. 12), if one is used, can also be combined at the interconnection box. The box contains a low-pass, anti-aliasing filter.

FIG. 9 illustrates an embodiment of the system with a dedicated processor 325 mounted on the sensor array bar 510. This micro-controller replaces the stand-along computer-based system, including the data acquisition card and battery. The interconnection card and anti-alaising filters are integrated directly into the processor unit. The bar-mounted processor 325 makes the system easier to operate and use. The main difference is that no raw data are stored and the graphical displays obtained during the measurement may not be as elaborate.

Transmitter. With reference to FIG. 7, the transmitter system 400 used for generating a signal in a sewer line (mains and laterals) is shown. A speaker 420 capable of generating low-frequency tones, typically less than 500 Hz, is packaged in a short section of cylindrical pipe 410 for insertion into a sewer main that is accessed through a manhole 130. The packaged speaker 470 is designed to fit snugly into the sewer main 120 at the manhole 130. Alternatively, a smaller speaker unit could be inserted directly into the pipe. A smaller speaker can also be attached directly into a clean-out 126 located in a lateral 122. The transmitter has a threaded connection for easy attachment to a threaded clean-out 126. Alternatively, the entire speaker unit can be designed for complete insertion into a manhole or a clean-out.

This approach will work with any type of non-pressurized pipe or conduit (e.g., a sewer or a storm drain). For pressurized piping that contains either gas or liquid, FIG. 6 shows that the acoustic source can be attached to the outer wall of the pipe (415) or to a valve (416), or to any other port that permits communication between the sound source and the substance in the pipe. While there are several modes of propagating an acoustic signal through a pipe, the strongest signal, and hence the signal that travels farthest along the pipe, is usually the compression acoustic signal that is generated in the liquid or gas contained in the pipe. Propagation of sound through the pipe wall itself is generally highly attenuated in comparison. The peristaltic or flexural propagation mode, whereby the acoustic signal travels at the interface between the fluid and the pipe wall, is also not as effective as the fluid propagation mode.

Acoustic signals are highly attenuated in the soil surrounding the pipe, and it is therefore best to use the lowest frequencies that can propagate through the pipe. The best choice of frequencies will depend on pipe diameter and material, but they are generally less than 1,000 Hz for shallow-buried pipe. The system has been successfully operated at frequencies between 100 and 1,000 Hz in an 8-in.-diameter sewer main with 4-in.-diameter laterals. Although it can operate at higher frequencies, measurements of signal attenuation in soil suggest that frequencies above 3 kHz are not practical.

While a CW signal is a very effective acoustic source for implementing this method, any acoustic source will suffice (e.g., a pulse system, a swept-frequency system). A CW system is both simple and inexpensive to implement and operate.

There are a number of ways to drive the transmitter. Referring to FIG. 5, the transmit waveform (or frequency of operation for a CW signal) can be generated at the remote transmitter itself 400, or it can be generated at the processor 300 and communicated to the transmitter. Because of the presence of standing waves in the pipe, it is possible that the location of the measurement transect may be at a null in the standing wave. As stated above, such standing waves do not affect the value of phase that is measured, but can decrease the magnitude of the signal such that it is not strong enough for analysis. One method of easily avoiding this problem is to change the transmit frequency. Alternatively, the entire array can be moved. The latter method may not always be easy to apply, because it is not desirable to make measurements too close to the main or the clean-out. For convenience and efficiency, a communication link between the processor 300 and the transmitter 400 is required. When the distance between the transmitter and processor is small, a cable 442 can be used. Because a cable is clumsy and generally inconvenient to use, especially when the distances between the processor and transmitter are large, the preferred embodiment uses a wireless communication link 350, 450.

This wireless method of generating the CW signal is very convenient and efficient, because it allows the operator to change frequencies instantaneously and remotely without interfering with the location and depth measurements. Without this link, any change in the operating frequency would have to be made at the transmit location, either by a second operator or by interrupting the location and depth measurements while physically moving to the transmitter location to make the change. This communication link is important for efficient data collection, because small changes in frequency may be needed to optimize signal strength.

The system can be operated using two or more transmitters at the same time provided that the phase reference for each transmitter is known. The simultaneous use of one or two manhole transmitters and/or one or more clean-out transmitters can extend the range of the locator system.

Signal-Receiving Array. The signal-receiving array 500 is shown in FIGS. 5, 8 and 9. This array of acoustic sensors can make quick estimates of the location and depth of most types of utility piping with only one or two positions of the array. The array shown in FIGS. 5 is 12 ft long and contains 25 acoustic sensing elements 530 spaced at 6-in. intervals. The array 500 is comprised of a horizontal bar 510 and a sensor strip 540, which is suspended from the bar with flexible guide wires 522. Each acoustic sensing element 530 is preferably mounted in a narrow, flexible strip 540 of acoustically absorbing material, such as rubber. Legs can be added to either end of the bar 510 so that it does not lie on the ground during or between measurements. The bar 510 is hollow. Wires 538 from each acoustic sensing element enter the bar through individual holes above each sensor; these wires, which are bundled inside the bar, are connected directly to the processor 300 through the interconnection box 340.

With reference to FIG. 8, each sensing element 530 consists of an acoustic sensor 532, a protective package 534, and a ground contact element 536. A small circuit board containing an amplifier and other signal conditioning components could also be included in the protective package 534. For cost/performance reasons, geophones 532 were selected as the sensing element. However, accelerometers and other types of acoustic sensors that can operate at frequencies less than 1,000 Hz would work just as well. An off-the-shelf, commercial package, comprised of the protective package 534 and ground contact element 536, was used to house the acoustic sensor. The sensor strip 540 hangs below the horizontal bar 510 and is sufficiently flexible and heavy to make measurements in uneven terrain. The acoustic sensing elements 530 are heavy enough to ensure good contact between the ground and the ground-contact elements 536. If necessary, better contact can be obtained by pushing the acoustic sensing element 530 into the ground.

The length of the bar (which is also the aperture of the system) and the number of sensors in the array are both arbitrary. The array 500 can consist of a single acoustic sensing element 530 that is repositioned repeatedly along the measurement transect until sufficient data exist to make location and depth measurements. Or, the array can consist of many sensors that save time by making simultaneous measurements along the transect. A bar that is very long and contains many sensors may become too heavy or too clumsy for one person to operate. Based on the fact that each acoustic measurement takes anywhere from several seconds to a few minutes, the length of the bar and the number of sensors should be designed for efficient operation.

The array shown in FIG. 5, which is light enough that it can be operated by one person, provides unambiguous phase measurements at transmit frequencies of 1,000 Hz or less. At this physical spacing of the sensors, phase differences of 90 degrees or less can be measured with a single sensor pair for frequencies less than 500 Hz. Thus at least four unambiguous phase measurements can be made for each wavelength. The number of unambiguous measurements increases as frequency decreases. Typical operating frequencies for this system are generally less than 500 Hz.

The preferred embodiment is designed to measure the location of utility pipe and conduit and to measure depth up to 10 ft. The acoustic data collected with the 12-ft sensor array is capable of locating pipe that is buried up to 10 ft deep and of determining the depth of pipe buried 3 to 4 ft. Since over 85% of sewer laterals and gas pipes are buried at 3- to 4-ft depths, most location and depth estimates can be made with a single array of sensors. For pipe that is buried deeper, it may be necessary to use two or more arrays in order to estimate depth. Again, for accurate estimates of either location or depth, the sensor array should be approximately centered cross-wise over the pipe.

Phase measurements. To make location and depth measurements with the preferred embodiment of the method, the relative phase between each point in the measurement transect must be measured, and a stable phase reference must be established. Drift in the frequency or time base (clock) during the data collection will result in phase errors that degrade the estimates of location and depth. Drifts are okay so long as they are accounted for in the phase reference or they are small enough to neglect. Drifts can be considered small when $\Delta f \Delta T << 1$, where $\Delta f$ is the frequency drift and $\Delta T$ is the propagation delay.

There are a number of ways to establish a phase reference and to collect the data to make these measurements. One way is to simultaneously record the transmitted signal and the data received at the sensor. The transmitted signal is used as the phase reference for the received data. This approach is very general and allows the transmitter to be turned on and off between each measurement. To implement it, a communication link must be established between the processor, the receiver and the system used to generate the transmitted waveform.

Another way is to transmit a periodic waveform of known frequency and to use a stable time base for collecting the received data. This is easily accomplished if the same processor is used to both generate the CW signal required to drive the transmitter at a known frequency and to collect the data measured with each sensor in the array. This approach works because the same time base is used for both transmitting and receiving. This approach can also work if the CW signal is generated at remote transmitter, but in this case the transmitted frequency must be highly stable so that it does not drift during a measurement. The main disadvantage to this approach is the need for a communication link between the remote transmitter and the processor, so that the operating frequency can be changed conveniently.

Either of these approaches can accommodate both the single-sensor technique (where phase data are collected serially as the sensor is repositioned repeatedly along the transect) and the sensor array technique (where data from numerous sensors aligned along the transect are collected simultaneously). If the transmitter is turned off between individual measurements by an array of sensors, the phase reference is lost. The loss of a phase reference due to the transmitter being turned on and off can be avoided if the transmitted signal is always begun at the same phase and the sensor acquisition system is always begun at the same phase relative to the transmitted signal. The preferred embodiment uses a combination of the two approaches.

A third approach is to simultaneously sample each sensor in an array of sensors and to reference the phase measured at any sensor to any other sensor in the array. For accurate phase measurements, the transmitted frequency must remain stable during the measurement. This is a good approach if the data can be collected in a short period of time and if only one transect is required to complete a measurement. If more than one array is required, then a phase reference must be established between each array of measurements. This can be accomplished, as stated above, by recording the transmitting waveform or by always starting a measurement at the same phase. The former is approach is preferred, because there may be an unknown time delay each time the transmitter is turned on. It can also be accomplished by using one or more sensors to collect data at the same location (i.e., by overlapping the array measurements) and then referencing the day from one array to those from the other.

There are many standard ways to make the phase measurements required to implement the method of the present invention. The approach used in the preferred embodiment was selected for operational convenience, performance, cost, and engineering simplicity.

Positioning System. There are many different types of positioning systems that can be used to measure the horizontal location and elevation of the acoustic sensors used in the receiving array or the ground positions in the measurement transect. These may include differential GPS, laser range finders, radar, electromagnetic and acoustic measurement systems. In addition the positions in the transect (or sensor array) could be surveyed or measured with a tape measure and a leveling string. The acoustic positioning systems shown in FIG. 11 are convenient to use, because acoustic measurements are already being made and the sensors needed to make the measurement already exist as part of the receiving array. The preferred system is shown in FIG. 11(a) because it is the simplest.

Measurement Procedure with a Computer-Based System. There are many ways to apply the method of the present invention. The location and depth of a buried pipe can be determined from measurements made by individual sensors, but this is very time consuming and inefficient. The preferred embodiment uses a single array of closely spaced sensors whose aperture is large enough that pipe buried up to 10 ft deep can be located and the depth of most utility piping can be estimated. As stated previously, over 85% of sewer laterals and gas pipes are found at depths of 3 to 4 ft. For accurate depth measurement beyond this range a second array of measurements will be required. There can be numerous variations in the number of sensors and the aperture of the array. The aperture, for example, can be increased or decreased to optimize the detection of pipes at a specific depth.

The computer-based system in FIG. 5 first locates the pipe and then measures the depth at which it is buried. The phase (and magnitude) at each location is integrated continuously over time, and estimates of location and depth are updated in real time. Once the data are sufficiently integrated (i.e., when the phase data does not change with time), the measurement can be stopped. The operator can set the maximum integration time for each measurement (e.g., 30 s), but most measurements, especially location measurements, will be completed over a shorter period of time than the maximum. The computer gives an audio indication of suitable phase measurements for both location and depth.

In general, the amount of data required during the search mode (i.e., location only) is less than what is required during the measurement mode (i.e., location and depth). If the pipe is shallowly buried, both location and depth can be measured with one array. When the pipe is at a greater depth, two contiguous measurements must be made. For best results, the pipe should be approximately in the center of the two contiguous measurement sets.

The processor has three buttons. The first operates the positioning system (if such a system is used) that determines the position and elevation of the sensors for the upcoming location and depth measurement. The second is the start/stop button for data acquisition. Once the operator depresses this button, the system will collect data until (1) the desired accuracy for a location/depth measurement is obtained, (2) the maximum time for a measurement is exceeded, or (3) the operator presses the button again to stop the run. The third button is used to enter the number of contiguous array measurements to be used in making an accurate estimate of location and depth. The location of the pipe (relative to one of the sensors) and the depth of the pipe are displayed on the processor screen.

Dedicated Processor Mounted on the Sensor Array Bar. For ease of use, FIG. 9 illustrates that the stand-alone processor can be replaced by a dedicated processor 325 mounted directly on the sensor bar 510. A small liquid crystal display (LCD) can be integrated into the processor for data collection and for data quality. The dedicated processor is operated similarly to the computer-based processor. The main advantage of this system is the reduction in weight and number of system components.

The same method and apparatus used to measure the horizontal location and depth of an underground pipe using the phase of the received acoustic signal can be implemented using the magnitude of the acoustic signal. The method uses a model of the magnitude of the received acoustic signal instead of a model of the phase. In one sense, the magnitude-based system is easier to implement than a phase-based system because no reference is required. The phase-based system, however, generally works much better because measurements are not affected by the coupling between the sensor and the ground. The phase-based system requires only that the signal received by a sensor be strong enough to be useful in the analysis (the adequacy of the signal can be assessed through the SNR). In practice, magnitude measurements are useful only for locating a pipe. Any non-uniform sensor-to-ground coupling degrades the accuracy of the location measurement and may make a measurement of depth impossible. As illustrated by field data in FIG. 10, field measurements indicate that phase measurements are significantly more accurate than magnitude measurements for location. The same data indicate that depth measurements are not easily made with an magnitude-based system. Another embodiment of the present invention uses both phase and magnitude.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method for determining the horizontal position of an underground pipe comprising the steps of:
   (a) transmitting a periodic acoustic signal along the pipe;
   (b) receiving the acoustic signal at at least three receiving locations, at least two of the locations on opposite sides of the pipe, and determining the relative phase of the acoustic signal received at each of the receiving locations; and
   (c) calculating the horizontal position of the pipe from the phase measurements, whereby the horizontal position is determined whether or not the pipe has leaked.

2. The method of claim 1, where calculating the horizontal position of the pipe includes obtaining an estimate of the minimum phase determined from the phase measurements.

3. The method of claim 1, where the acoustic signal is a continuous wave (CW) signal.

4. The method of claim 1, where the acoustic signal is received along a linear measurement transect.

5. The method of claim 4, where the measurement transect is positioned approximately perpendicular to the pipe.

6. The method of claim 1, further comprising the step of determining the horizontal position and elevation of at least two of the receiving locations with a positioning system.

7. The method of claim 6, where the positioning system is an acoustic system in which the horizontal position and elevation of a receiving location is determined by triangulation from (a) at least two acoustic transmitters located at known horizontal positions and elevations on a sensor array bar and (b) the receiving location.

8. The method of claim 1, where the acoustic signal is received at the receiving locations with at least two receivers in an array.

9. The method of claim 8, where the array is linear.

10. The method of claim 9, where the linear array is positioned approximately perpendicular to the pipe.

11. The method of claim 8, further comprising the step of determining the horizontal position and elevation of at least two receivers in the array with a positioning system.

12. The method of claim 11, where the positioning system is an acoustic system in which the horizontal position and elevation of a receiver is determined by triangulation from (a) at least two acoustic transmitters mounted at known horizontal positions and elevations on a sensor array bar and (b) the receiver.

13. The method of claim 12, where the sensor array bar is held level and directly over the receivers in the array.

14. A method for determining the horizontal position of an underground pipe comprising the steps of:
    (a) transmitting a periodic signal along the pipe;
    (b) receiving the acoustic signal at at least two receiving locations, and determining the relative phase of the acoustic signal received at each of the receiving locations; and
    (c) calculating the horizontal position of the pipe from the phase measurements, whereby the horizontal position is determined whether or not the pipe has leaked.

15. A method for determining the depth of an underground pipe comprising the steps of:
    (a) transmitting a periodic acoustic signal along the pipe;
    (b) receiving the acoustic signal at at least three receiving locations, at least two of the locations on opposite sides of the pipe, and determining the relative phase of the acoustic signal received at each of the receiving locations; and
    (c) calculating the depth of the pipe from the phase measurements.

16. The method of claim 15, where the depth of the pipe is determined from the shape of a mathematical curve fit to the phase data.

17. The method of claim 15, where the depth of the pipe is determined from a mathematical model that predicts accurately the phase measurements as a function of depth.

18. The method of claim 15, where the acoustic signal is a continuous wave (CW) signal.

19. The method of claim 15, where the acoustic signal is received along a linear measurement transect.

20. The method of claim 19, where the measurement transect is positioned approximately perpendicular to the pipe.

21. The method of claim 15, further comprising the step of determining the horizontal position and elevation of at least two of the receiving locations with a positioning system.

22. The method of claim 21, where the positioning system is an acoustic system in which the horizontal position and elevation of a receiving location is determined by triangulation from (a) at least two acoustic transmitters located at known horizontal positions and elevations on a sensor array bar and (b) the receiving location.

23. The method of claim 15, where the acoustic signal is received at the receiving locations with at least two receivers in an array.

24. The method of claim 23, where the array is linear.

25. The method of claim 24, where the linear array is positioned approximately perpendicular to the pipe.

26. The method of claim 23, further comprising the step of determining the horizontal position and elevation of at least two receivers in the array with a positioning system.

27. The method of claim 26, where the positioning system is an acoustic system in which the horizontal position and elevation of a receiver is determined by triangulation from (a) at least two acoustic transmitters mounted at known horizontal positions and elevations on a sensor array bar and (b) the receiver.

28. The method of claim 27, where the sensor array bar is held level and directly over the receivers in the array.

29. A method for determining the depth of an underground pipe comprising the steps of:
    (a) transmitting a periodic acoustic signal along the pipe;
    (b) receiving the acoustic signal at at least two receiving locations, and determining the relative phase of the acoustic signal received at each of the receiving locations; and
    (c) calculating the depth of the pipe from the phase measurements.

30. An apparatus for determining the horizontal position and depth of an underground pipe, comprising:
    (a) an acoustic transmitter for transmitting a periodic signal along the pipe;
    (b) at least two acoustic receivers for receiving the acoustic signal, the receivers mounted in an array, where the array includes a mechanism for positioning the receivers on an uneven surface; and
    (c) a processor for determining the relative phase of the acoustic signal received at at least two receiving locations, and for calculating the location of the pipe from the phase measurements.

31. The apparatus of claim 30, where the transmitter transmits a continuous wave (CW) signal.

32. The apparatus of claim 30, further comprising an electronic communications link between the transmitter and the processor.

33. The apparatus of claim 32, where the electronic communications link is wireless.

34. The apparatus of claim 30, where the acoustic receiver is a geophone.

35. The apparatus of claim 30, where the acoustic receiver is an accelerometer.

36. The apparatus of claim 30, where the receivers are mounted in a linear array.

37. The apparatus of claim 30, where the receivers are suspended from a rigid sensor bar and mounted to a flexible, sound absorbing strip of material that allows good contact between the ground and the receivers even when the surface is uneven.

38. The apparatus of claim 30, where the array is a two-dimensional array.

39. The apparatus of claim 37, where an operational control for making a measurement is located on the sensor bar.

40. The apparatus of claim 37, where the processor is mounted directly on the sensor bar.

41. An apparatus for determining the horizontal position and depth of an underground pipe, comprising:
    (a) an acoustic transmitter for transmitting a periodic acoustic signal along the pipe;
    (b) at least two acoustic receivers for receiving the acoustic signal;
    (c) a positioning system for determining the horizontal position and elevation of at least two of the receivers in the array; and (d) a processor for determining the relative phase of the acoustic signal received at at least two receiving locations, and for calculating the location of the pipe from the phase measurements.

42. The apparatus of claim 41, where the positioning system is an acoustic positioning system.

43. The apparatus of claim 42, where the acoustic positioning system is added to the sensor bar, and the acoustic positioning system comprises (a) at least two acoustic transmitters located at known horizontal positions and elevations along the bar and (b) a processor to compute the horizontal position and elevation of receivers in the array.

44. The apparatus of claim 43, further comprising means for holding the bar horizontally and directly above the receivers during the positioning measurements.

45. The apparatus of claim 43, further comprising means for indicating that the bar is horizontal.

46. The apparatus of claim 43, where at least one receiver is positioned at a known distance from the acoustic transmitters.

47. The apparatus of claim 46, where at least one receiver is suspended from the bar and can hang vertically.

48. The apparatus of claim 46, where at least one receiver is mounted on the bar at a known distances from each of the transmitters.

49. The apparatus of claim 43, where at least two of the transmitters are at different elevations.

50. An apparatus for determining the horizontal position and depth of an underground pipe, comprising:
   (a) an acoustic transmitter for transmitting a periodic signal along the pipe;
   (b) an acoustic receiver for receiving the acoustic signal; and
   (c) a processor for determining the relative phase of the acoustic signal received at at least two receiving locations, and for calculating the horizontal position and depth of the pipe from the phase measurements.

* * * * *